United States Patent
Damkjaer et al.

(10) Patent No.: US 6,237,750 B1
(45) Date of Patent: May 29, 2001

(54) TRANSPORT BAND FOR CONVEYING ALONG A SPIRAL PATH

(75) Inventors: Poul Erik Damkjaer, Vejle Øst (DK); Jack Ronald Raum, Winchester; Andrew Clyde Smith, Oakton, both of VA (US)

(73) Assignees: Uni-Chains International (DK); Ashworth Bros., Inc., MA (US)

( * ) Notice: Subject to any disclaimer, the term of this patent is extended or adjusted under 35 U.S.C. 154(b) by 0 days.

(21) Appl. No.: 09/147,145

(22) PCT Filed: Apr. 10, 1997

(86) PCT No.: PCT/DK97/00153

§ 371 Date: Oct. 16, 1998

§ 102(e) Date: Oct. 16, 1998

(87) PCT Pub. No.: WO97/38925

PCT Pub. Date: Oct. 23, 1997

(30) Foreign Application Priority Data

Apr. 16, 1996 (DK) .................................... 0439/96

(51) Int. Cl.[7] ........................ B65G 13/02; B65G 17/10; B65G 17/06
(52) U.S. Cl. .................. 198/778; 198/822; 198/852
(58) Field of Search .................. 198/852, 778, 198/822

(56) References Cited

U.S. PATENT DOCUMENTS

| | | | |
|---|---|---|---|
| 3,938,651 | 2/1976 | Alfred et al. | 198/136 |
| 4,901,844 | 2/1990 | Palmaer et al. | 198/778 |
| 5,070,999 | 12/1991 | Layne et al. | 198/778 |
| 5,277,301 * | 1/1994 | Fenty | 198/778 |
| 5,458,228 | 10/1995 | Olsson | 198/778 |
| 5,515,775 * | 5/1996 | Crump, III et al. | 198/778 |
| 5,569,194 | 10/1996 | Ericson et al. . | |
| 5,738,205 * | 4/1998 | Draebel | 198/852 |

FOREIGN PATENT DOCUMENTS

| | | |
|---|---|---|
| 2 410 392 | 9/1974 | (DE) . |
| 0 002 137 A1 | 5/1979 | (EP) . |
| 468 809 | 3/1993 | (SE) . |
| 501 260 | 12/1994 | (SE) . |
| WO 94/29201 | 12/1994 | (WO) . |
| WO 95/16627 | 6/1995 | (WO) . |
| WO 95/28343 | 10/1995 | (WO) . |
| WO 96/38357 | 12/1996 | (WO) . |

* cited by examiner

*Primary Examiner*—Robert P. Olszewski
*Assistant Examiner*—Bryan Jaketic
(74) *Attorney, Agent, or Firm*—Nixon Peabody LLP; Jeffrey L. Costellia

(57) ABSTRACT

A conveyor belt (1) is composed of a number of identical links in the formation of an endless belt, where each link comprises at least one axle (3) arranged transversely in relation to the direction of travel (2), and an outer link (4) at each side in engagement with the axle. Each outer link comprises an elongated hole for the adjacent link's axle, so that the belt can be driven in a curve in the plane of the belt. Each outer link has at least one securing hole for a transverse axle, where the coupling-together between the axle (3 and the outer link (4) is effected by a separable snap-lock. The outer link is moulded as a one-piece unit in a suitable plastic material, preferably by injection moulding. The outer links (4) can also be configured in a larger version for the construction of conveyor belts for operation in self-stacking helical systems.

18 Claims, 15 Drawing Sheets

Figure 1:
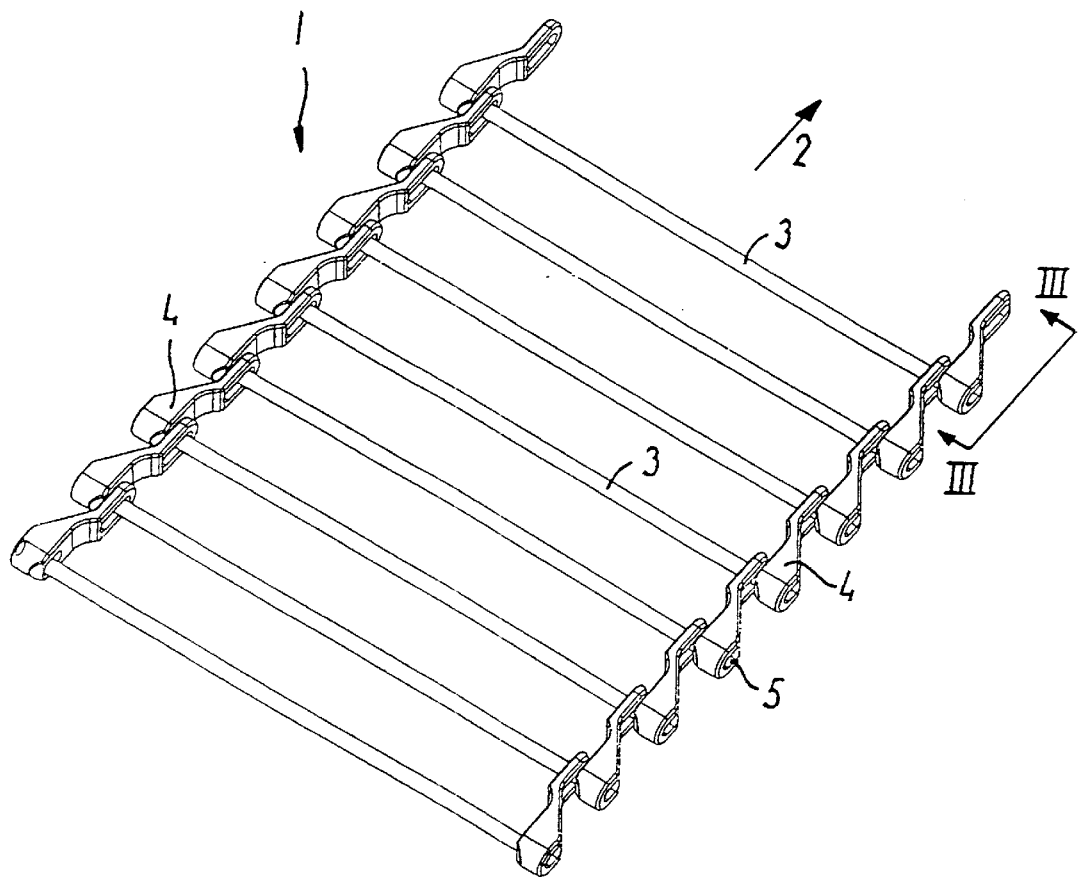

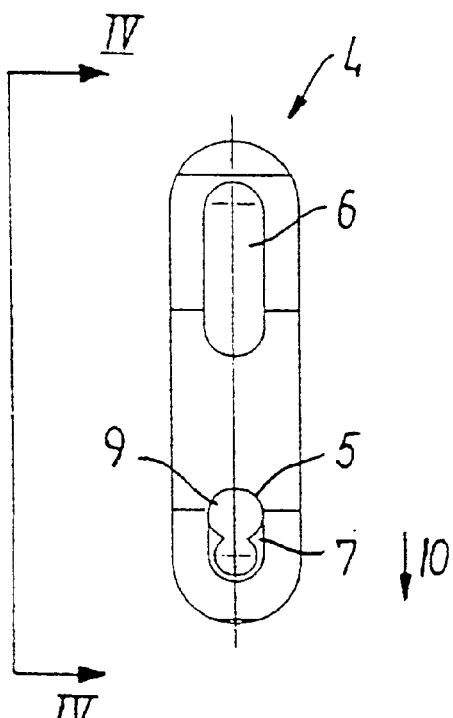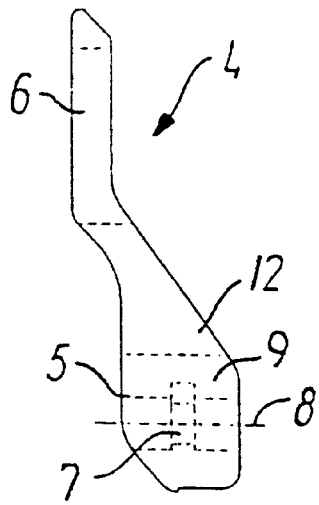
FIG.3    FIG.4
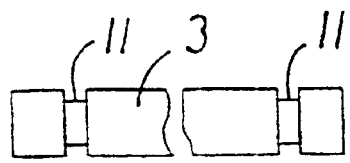
FIG.5

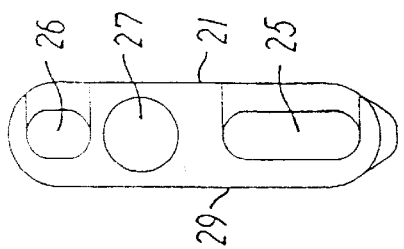
FIG.14
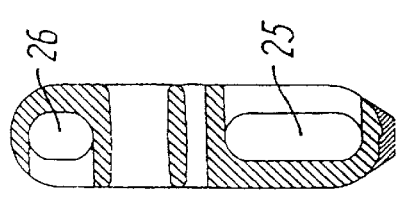
FIG.9
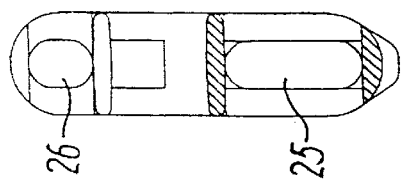
FIG.8
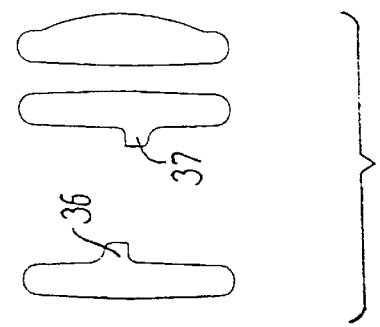
FIG.10
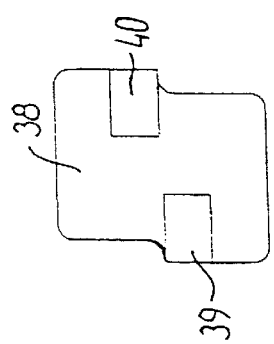
FIG.11
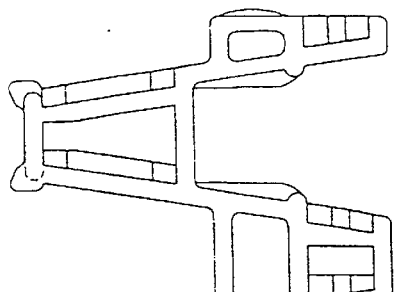
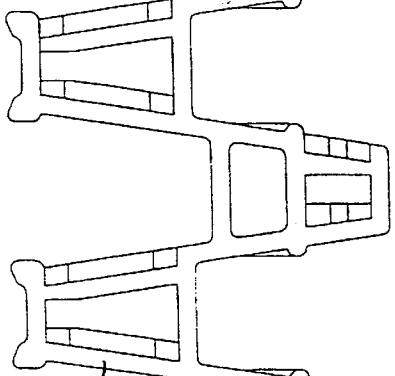
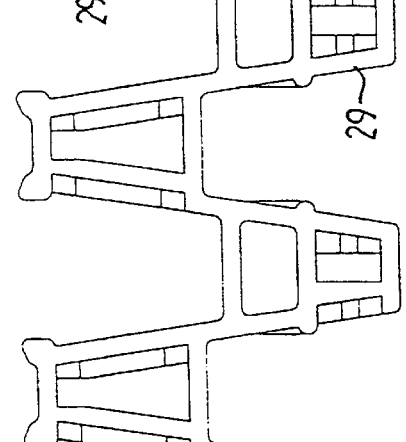
FIG.12
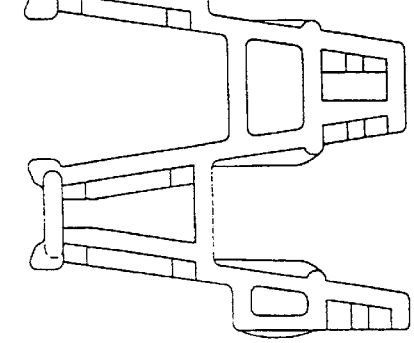

TRANSPORT BAND FOR CONVEYING ALONG A SPIRAL PATH

PRIOR ART TECHNIQUE

The invention concerns a conveyor belt of the kind disclosed in the preamble to claim 1. Such conveyor belts arranged for the transport of items, e.g. food products, canned goods and the like, are known from EP patent application No. 0283209 (Ashworth Bros. Inc., US) or EP patent No. 0288475 (Frigoscandia Food Process Systems Aktiebolag, SE), where the latter publication discloses a conveyor belt arranged especially for operation in connection with helical plants for cold storages for the freezing of newly-produced food products or portions of food products.

All of the parts in the known conveyor belts are normally made of steel and are assembled by welding of the individual parts in the formation of a chain link, where the outer links are so strong that they can support the overlying parts of the belt when operating in a helical plant.

The known constructions have several disadvantages. Firstly, certain food products have a tendency to freeze fast on the metal belts, even though these have wire- or net-formed supporting surfaces. Thereby food-product remains are left on the belt after the thermal treatment, which is undesirable not only from the point of view of hygiene but also because it necessitates an increase in the efforts required for cleaning. Another great disadvantage is that the known belts require tools, e.g. welding equipment etc., to effect repairs if the belt breaks. It is a particularly difficult task to repair a conveyor belt that has broken, especially if the belt runs in a helical manner in a cold storage plant, where the working space is restricted and where all of the parts are severely cooled down. Therefore, the repair of broken belts is usually a complicated matter, and it takes a long time to rectify the damage.

ADVANTAGES OF THE INVENTION

By configuring the conveyor belt according to the invention as disclosed and characterized in claim 1, the result is a belt where the individual parts are assembled without the use of tools, and particularly without the use of welding equipment etc., The belt can be assembled and disassembled without the use of tools, and this means that possible repairs and replacement of worn parts can be carried out much more quickly than with the known types of belts. Furthermore, the whole of the belt can be made of plastic, which means that food products, e.g. bread, poultry etc. which are to be frozen down, do not so easily freeze fast to the belt.

The conveyor belt according to the invention can be used both as a straight-running belt as well as for running in curves, and also as a self-stacking helical belt in units for the thermal treatment of food products, but it will also be able to be used for the accumulation of items between machines, e.g. in a production line.

The traction in the conveyor belt according to the invention is transferred from link to link through the outer links, which are coupled together by the axles. In special cases, i.e. at very great loads where high tractive forces require to be used, steel axles can be inserted at the outer links, but outer links of plastic are sufficiently strong with the loads which arise in normal practice.

By configuring the snap-lock according to the invention in each outer link as disclosed and characterized in claim 2, the configuration achieved hereby is one which can be produced in a simple manner by injection moulding at the same time that the outer link is moulded. In a simple manner, a recess in each end of the axle can engage with the snap-lock in the outer links, and snap-locks of the kind disclosed in claim 2 can easily be configured so that the traction which is in the belt for the driving of the belt ensures that the parts cannot be separated before the conveyor belt is standing still without traction.

In conveyor belts of the kind described, the solid axles can be of steel or plastic, depending on the kind of product required to be transported.

By configuring the conveyor belt according to the invention and as disclosed and characterized in claim 3, it is achieved that that end of each outer link, in which the elongated hole for the axle in the adjacent link extends, is held out in place at each side, so that regardless of the direction in which the belt 1 is running, and regardless of what kind of underlayer or track the belt is sliding on, the partly free ends of the outer links cannot move inwards because of the positioning element in each side. If a piece of tubing is used as positioning element or spacing element, the possibility is provided at the same time of being able to stop the feeding of the products on the belt without stopping the belt, in that the tube pieces can be arranged to function as rollers, so that the conveyor belt can function as an accumulation conveyor.

By configuring the conveyor belt according to the invention as disclosed in the preamble to claim 4, i.e. with a further support element of plastic which surrounds the axles, a belt with small opening can be achieved, i.e. a belt which can transport small items. With this configuration, the items always rest on a plastic underlayer, so that raw foodstuffs or other items do not freeze fast to this layer during the freezing-down. When further support elements are configured as disclosed and characterized in claim 4, it is achieved that when running in curves, e.g. in a helical system, the belt cannot bend around the axles while it is in the helical system, but is locked by the cooperating parts. The belt thus remains flat during its ascent in the helix, and cannot, for example, lift up at the outer edge because of the tractive force. When the belt again runs in a straight line, it will again be able to bend around the axles, e.g. around a driving sprocket or a carrier wheel.

The invention also concerns a conveyor belt as disclosed in the preamble to claim 5. By configuring the further support elements or grid elements according to the invention and as disclosed and characterized in claim 5, further advantages can be achieved. "Concealed" areas which are difficult to clean are hereby avoided, so that the belt according to the invention becomes easier to clean. Furthermore, the support elements can be produced quickly by injection moulding, in that the tool construction does not require gates, but merely comprises an ordinary two-part injection mould which opens immediately upon the conclusion of a moulding cycle.

The invention also concerns a conveyor belt as disclosed in the preamble to claim 6. By configuring the conveyor belt according to the invention as disclosed and characterized in claim 6, i.e with outer link of large type, the same unit, i.e. the outer links, can at one and the same time be both outer link and secure the axles, transfer the tractive force etc. through the belt as described above, and comprise those elements which maintain the vertical distance between the belt parts during operation in a helical system. The large outer links are also injection moulded as a one-piece unit of plastic.

If the outer links of the large type are configured as disclosed and characterized in claim 7, the possibility is provided for a suitable radius for rearward bending of the belt in those conveyor units in which this is required.

If the conveyor belt according to the invention is to be used for operation in a helical system with heavy loads or with many tiers in the helix, the outer links can preferably be configured with reinforcement ribs as disclosed and characterized in claim 8.

The outer links for the conveyor belt according to the invention can be configured as disclosed and characterized in claim 9, in that the whole of the belt is hereby automatically provided with railings, which enables the transport of small, round objects, e.g. cans.

If the conveyor belt according to the invention is to be used in a helical system, e.g. for the freezing of fresh food products, the large outer links are preferably configured as disclosed and characterized in claim 10. An improved possibility is hereby achieved for the circulation of cold air. Outer links with this configuration will also be able to be used for heating or in connection with other processing of food products with air or gases.

By configuring the conveyor belt according to the invention as disclosed and characterized in claim 11, each outer link is provided with a wear and protection plate at a place where it does not interfere with the outer link's remaining functions. In addition to the advantage of increased lifetime, this is also of significance for the hygiene that a wear and protection plate is inserted in each link. In certain helical systems, the helical stack itself rests on an underlayer which, e.g., can be an endless chain, e.g. a steel chain on ball tracks as shown in patent No. 0110856 (Frigoscandia Food Process Systems Aktiebolg, SE). Plastic chain links and steel chain links do not work particularly well together, in that they do not tolerate contact with each other, but can give rise to corrosion and other undesired phenomena. If the plastic chain is of acetal, there can arise contaminating biproducts which can pollute the belt and herewith the items on the belt, but this is completely avoided with the use of the wear-plates according to claim 11.

The conveyor belt according to the invention is preferably configured as disclosed and characterized in claims 12, 13 or 14, in that the special advantages achieved with the outer links according to the foregoing claims can also be achieved with the outer link according to claim 6.

THE DRAWING

Figure 2:
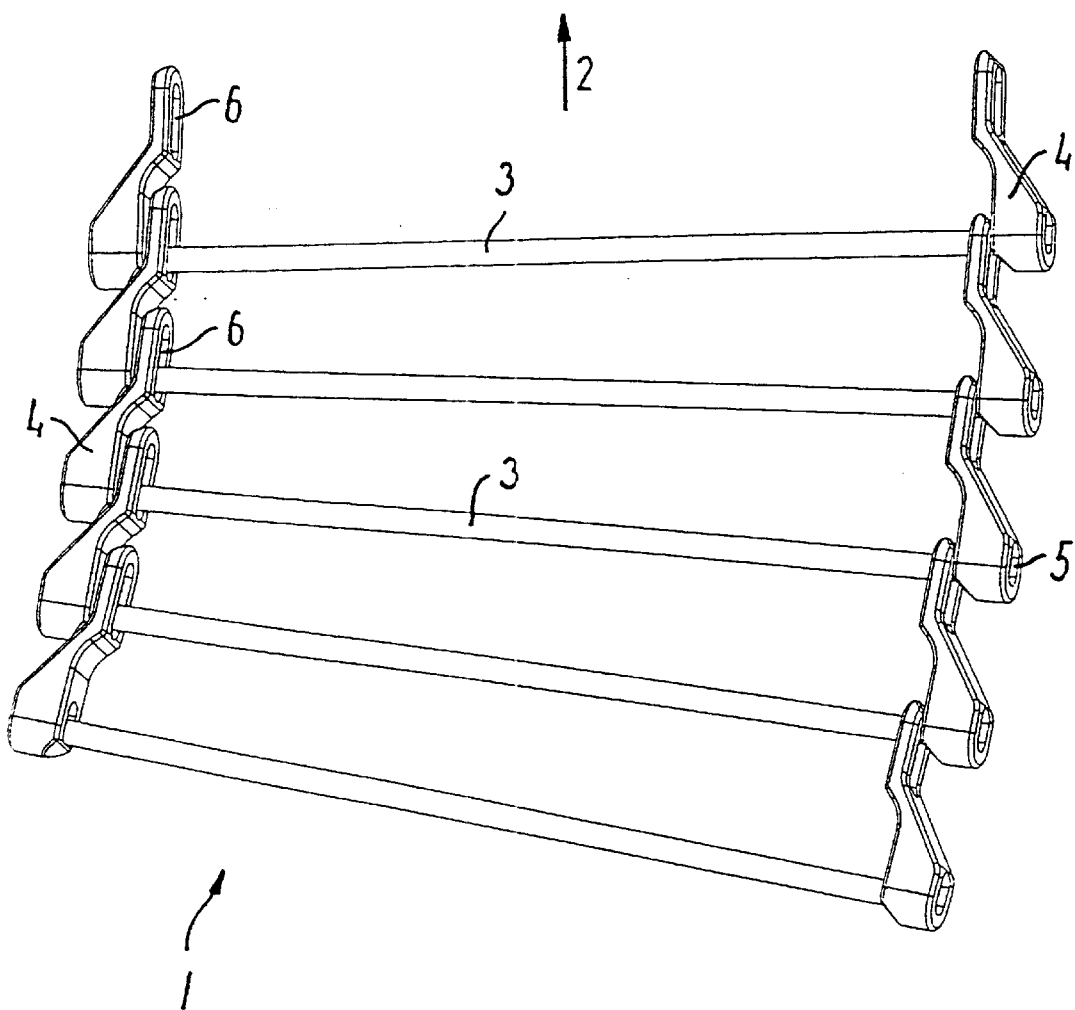
Figure 2A:
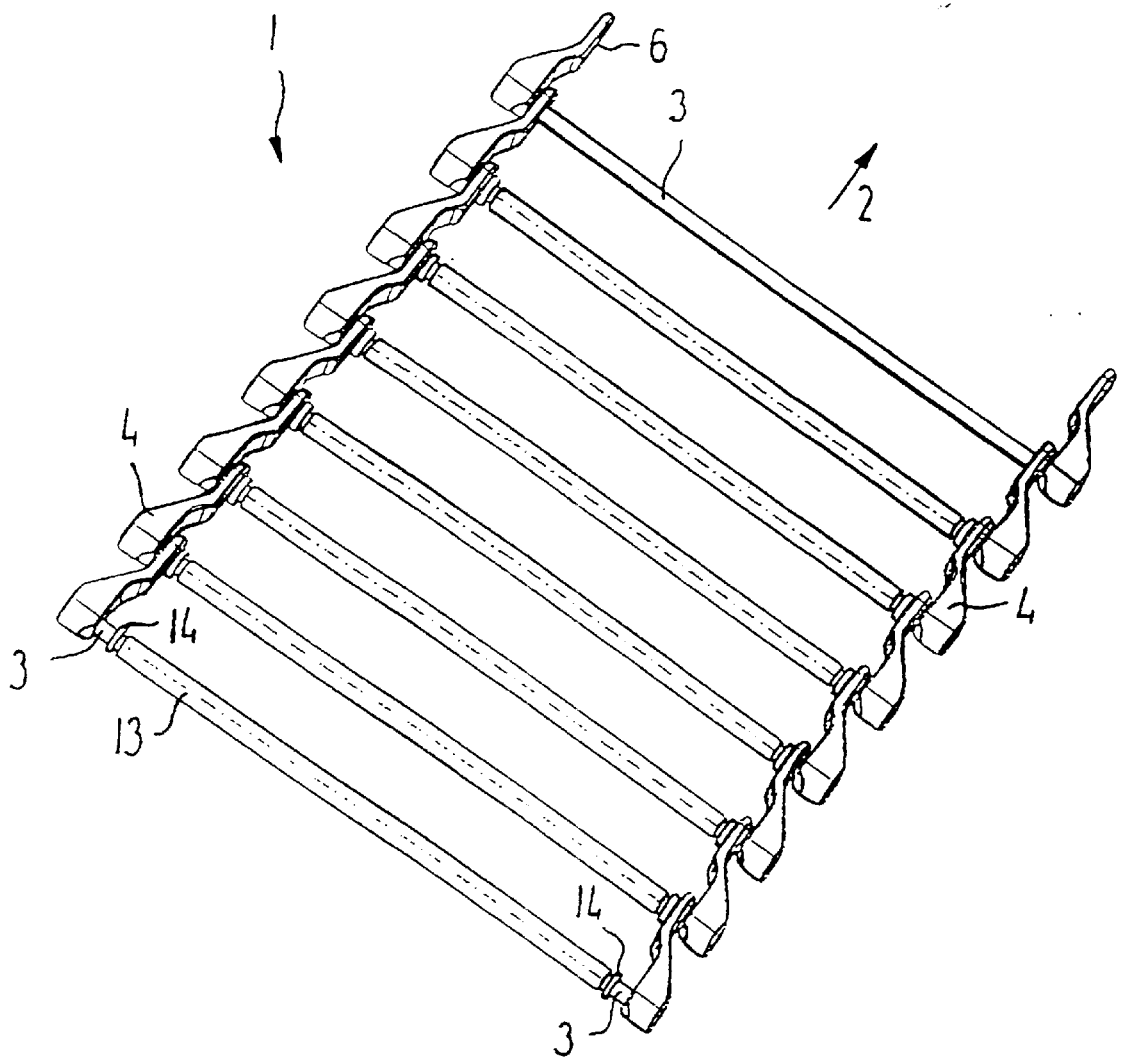
Figure 6:
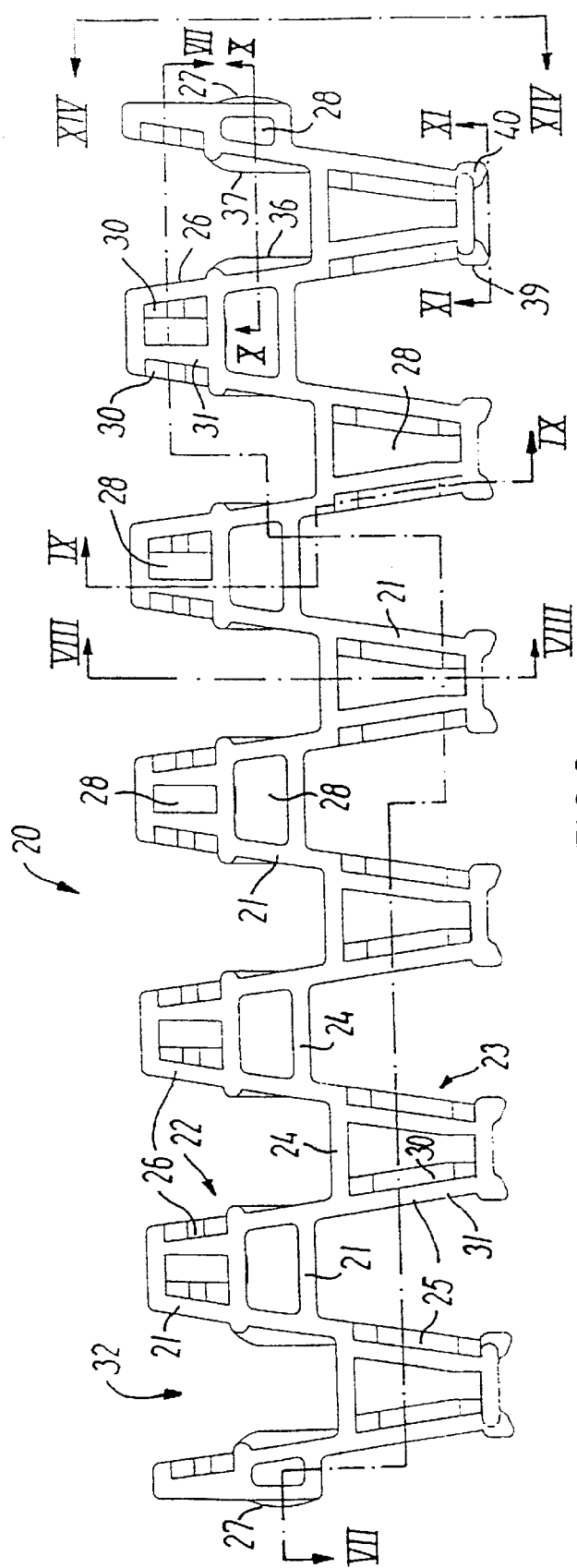
Figure 7:
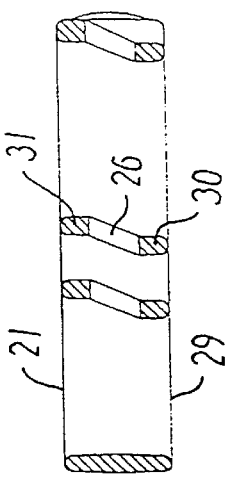
Figure 7:
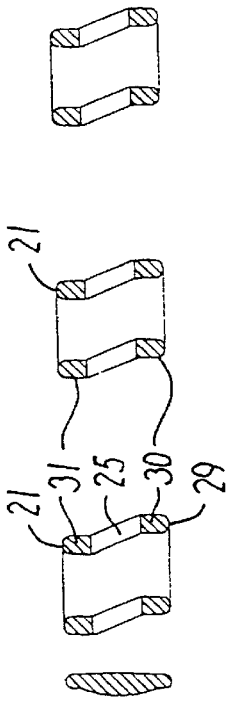
Figure 13:
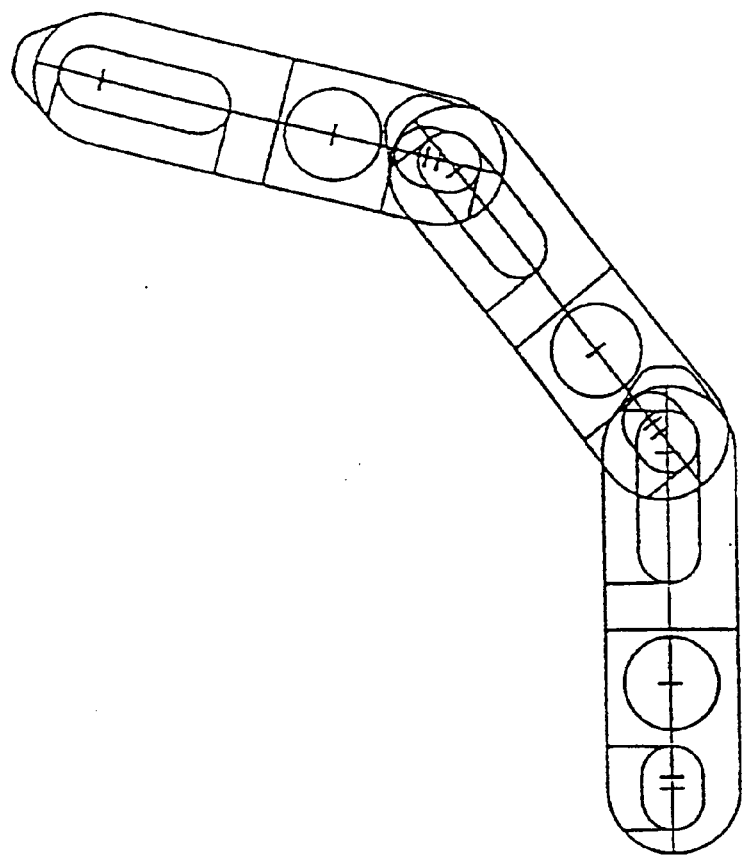
Figure 17:
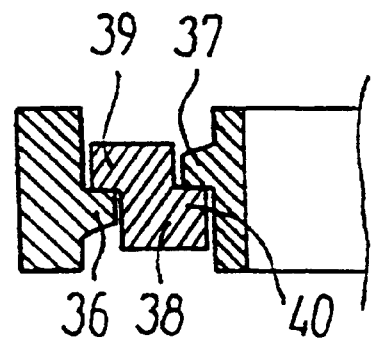
Figure 15:
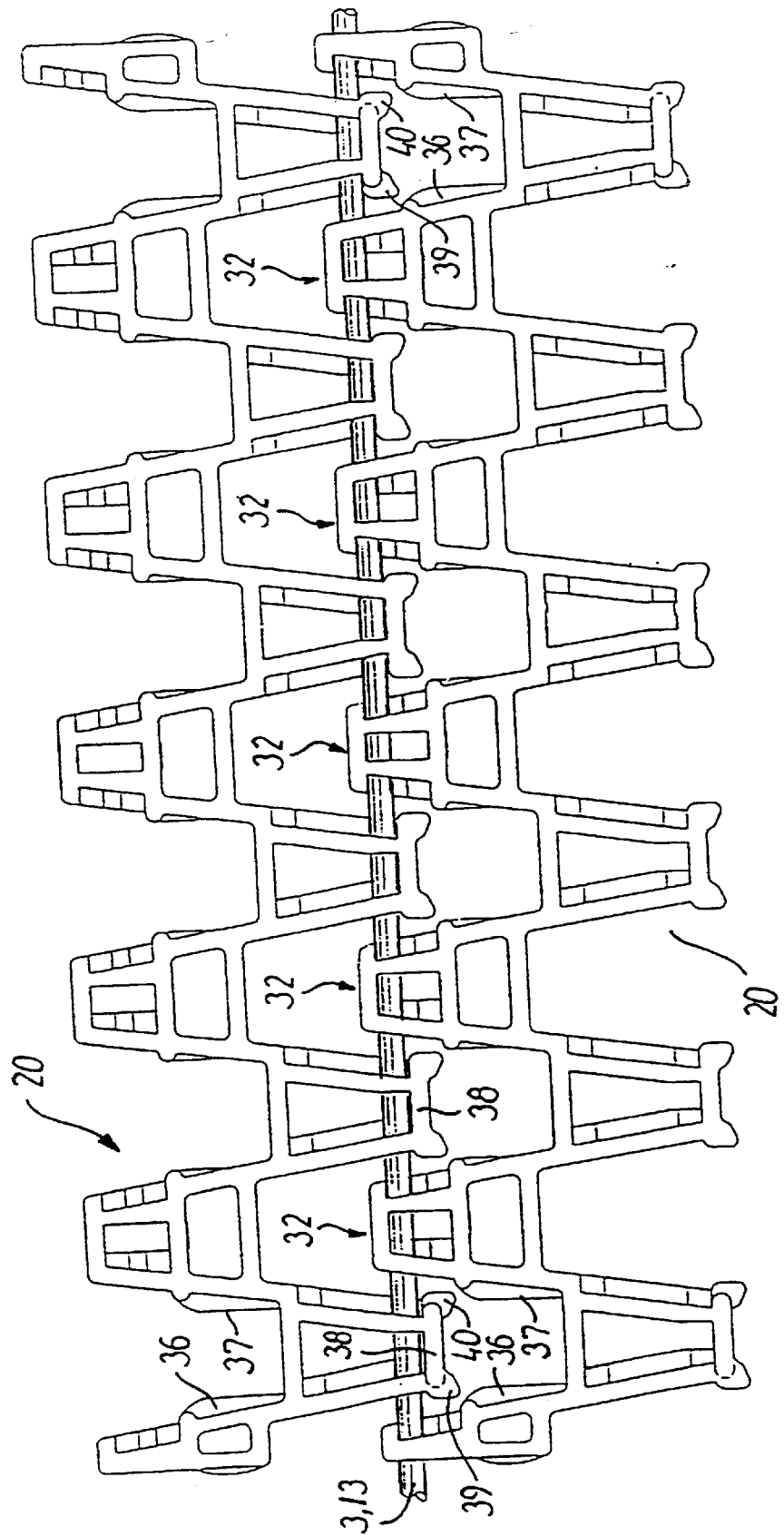
Figure 16:
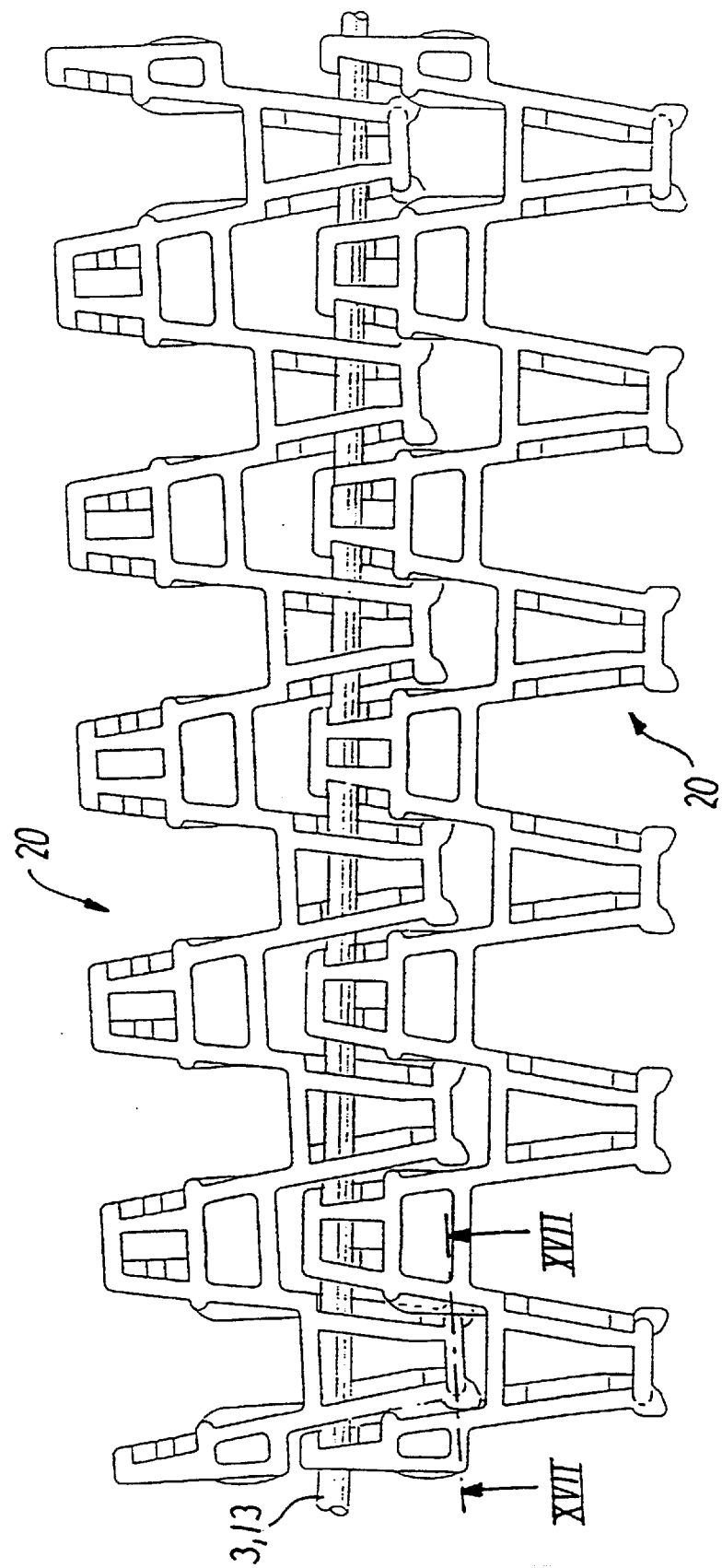
Figure 18:
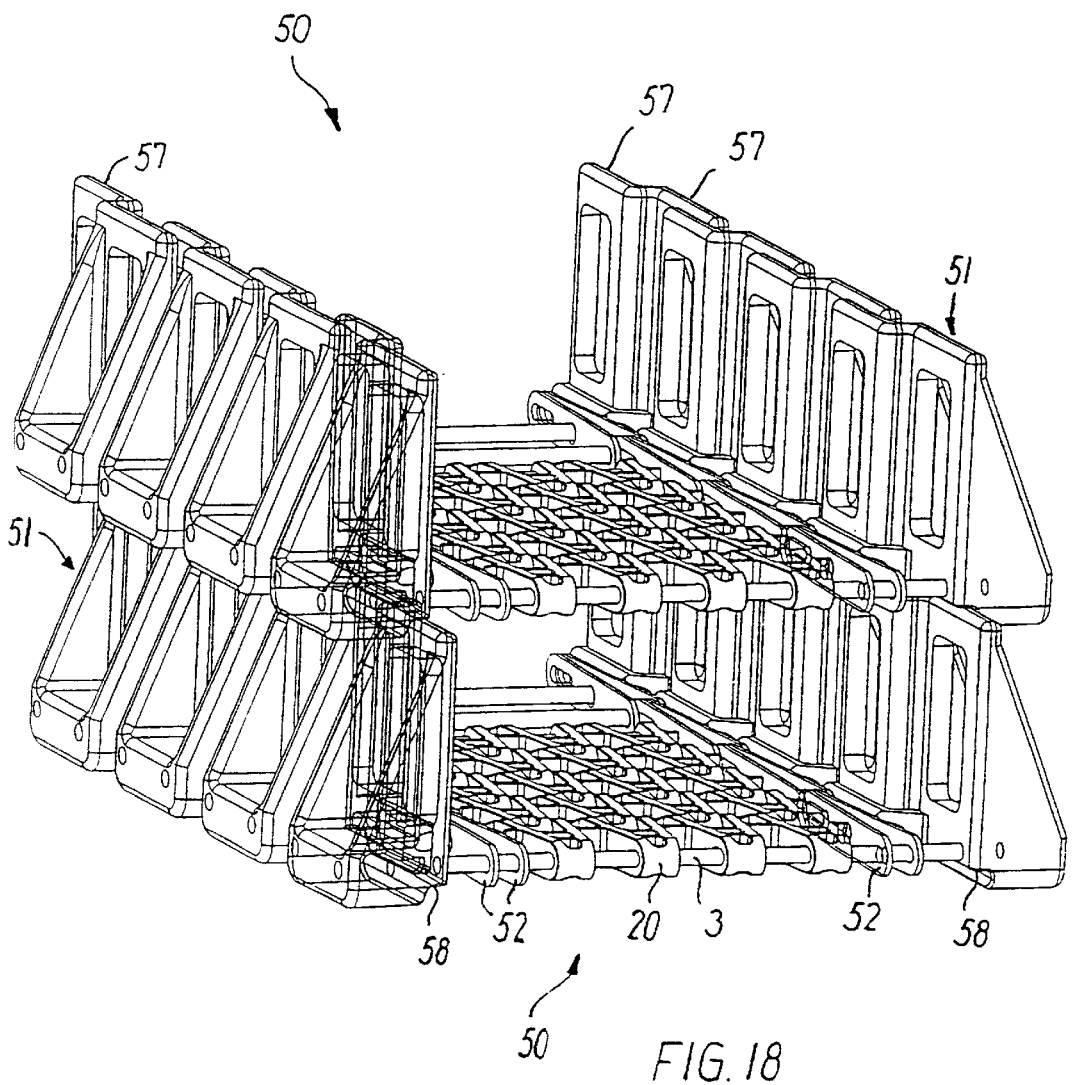
Figure 19:
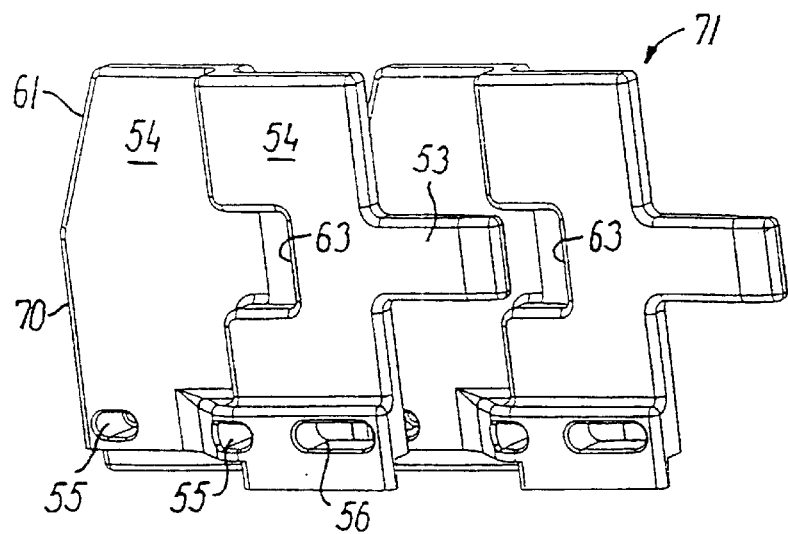
Figure 20:
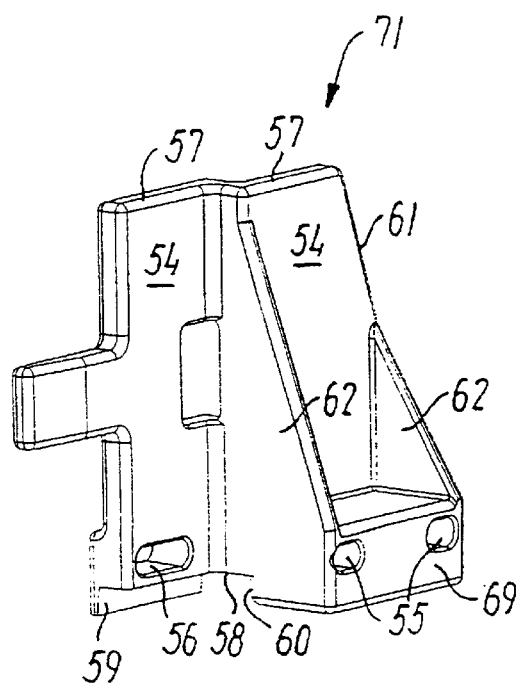
Figure 21:
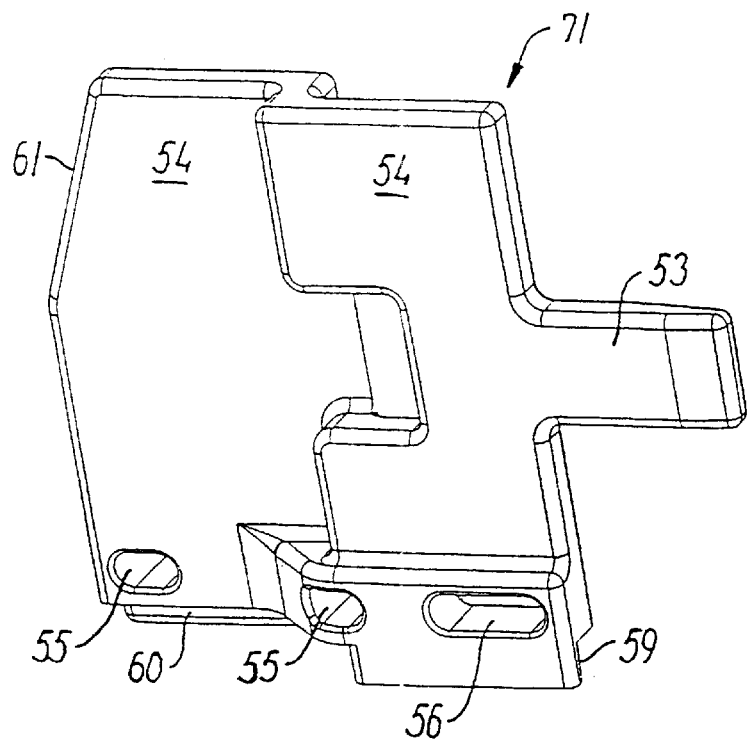
Figure 22:
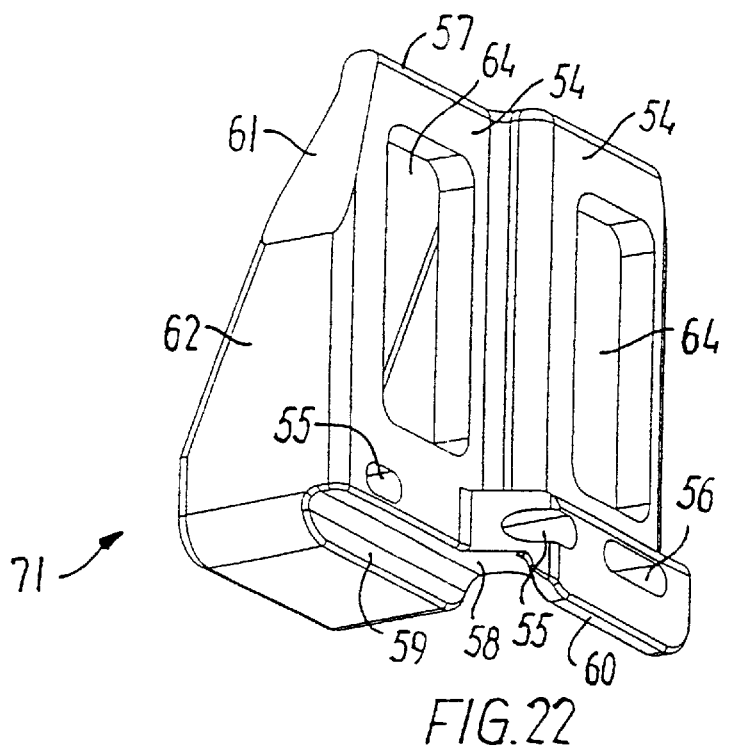
Figure 23:
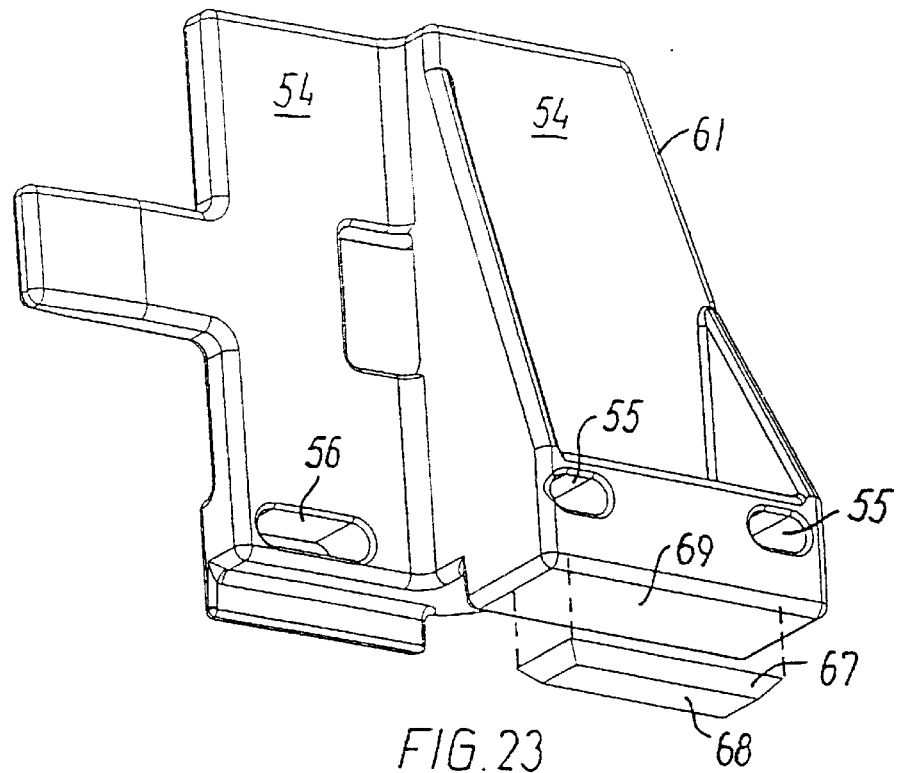
Figure 24:
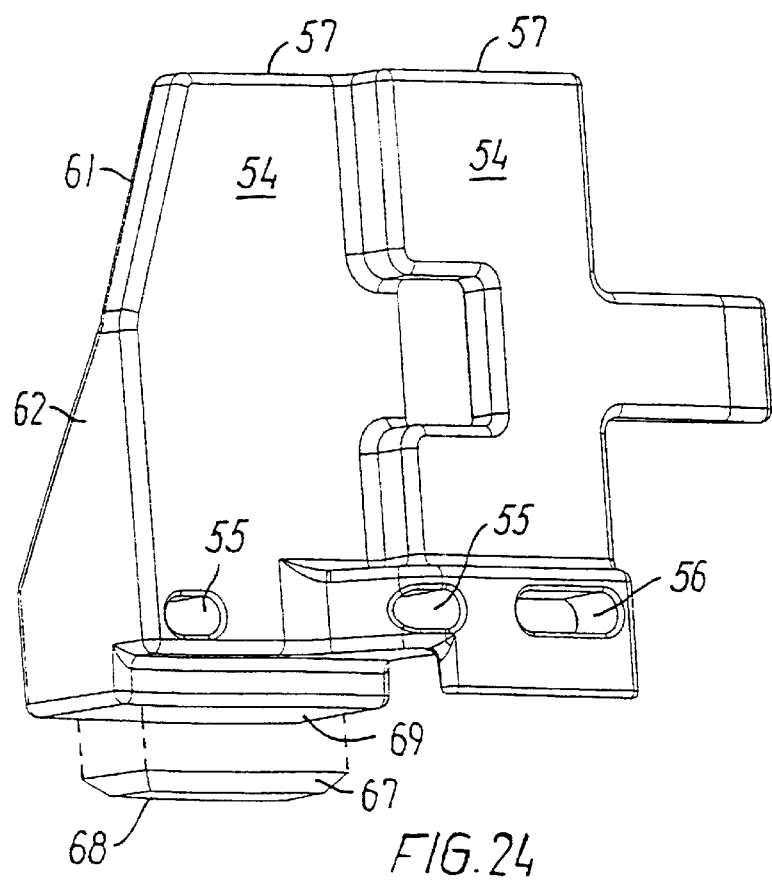
Figure 25:
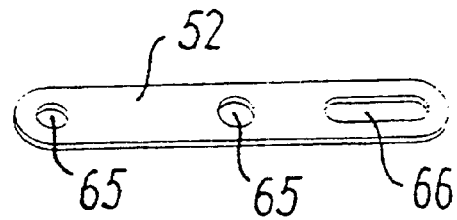
Figure 26:
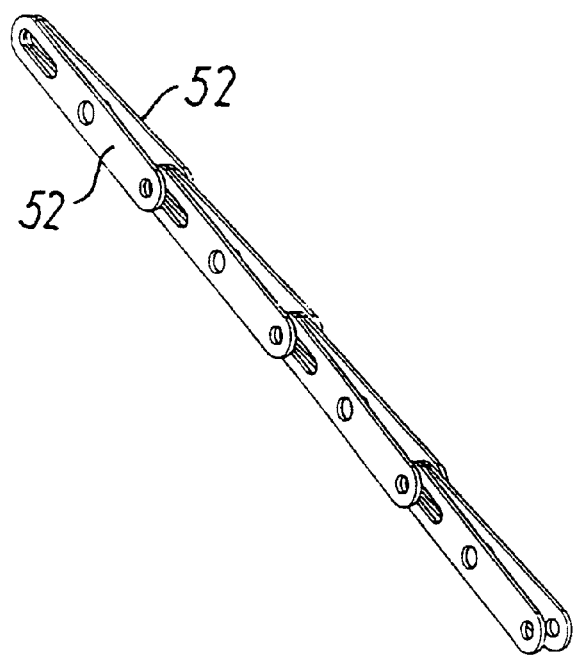
Figure 27:
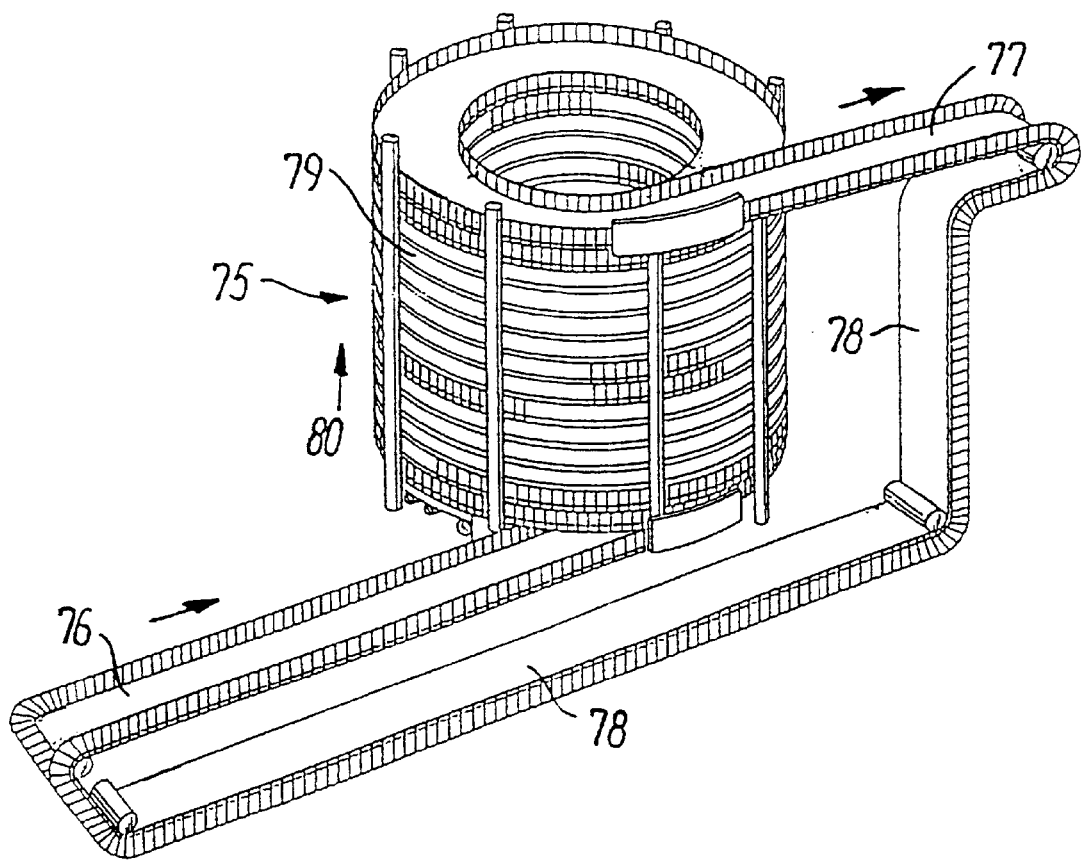

The invention will now be described in more detail with reference to the drawing, in that FIG. 1 shows a section of a belt with small outer links according to a first embodiment of the invention, seen in perspective and while running along a straight path, FIG. 2 shows the same belt as in FIG. 1, but while running in a curve, FIG. 2A shows the same belt as in FIG. 1, but in a second embodiment, FIG. 3 shows on a larger scale an outer link for the belt in FIGS. 1 and 2, and seen in the direction III—III in FIG. 1, FIG. 4 shows the link in FIG. 3, but seen in the direction IV—IV in FIG. 3, FIG. 5 shows an axle for use in the belt in FIGS. 1 and 2, FIG. 6 shows on a larger scale a chain link in the form of a grid element for the belt in FIGS. 1–2, and seen directly from above, i.e. at right-angles to the supporting top surface, FIG. 7 shows a plane section VII—VII in FIG. 6, FIG. 8 shows a plane section VIII—VIII in FIG. 6, FIG. 9 shows a plane section IX—IX in FIG. 6, FIG. 10 shows a plane section X—X in FIG. 6, FIG. 11 shows a plane section XI—XI in FIG. 6, i.e. a part of the chain link seen from the front, FIG. 12 shows the same chain link as in FIG. 6, but seen from below, FIG. 13 shows a number of chain links (three) seen from the side while running in a straight path around a drivewheel (not shown), FIG. 14 shows the chain link in FIG. 6 seen from the side in the direction XIV—XIV, FIG. 15 shows how the chain links in FIGS. 6–14 are coupled together and in engagement with one another (while running in a straight path), FIG. 16 shows the same as in FIG. 15, but while running in a curve, e.g. in a helical system, FIG. 17 shows a plane section XVII—XVII in FIG. 16, FIG. 18 shows in perspective a section of a conveyor belt in two tiers and according to a second embodiment, i.e. with large outer links, FIG. 19 shows two large outer links in perspective and seen from that side which faces inwards towards the product-bearing part of the conveyor belt, FIG. 20 shows in perspective a single, large outer link seen from the outer side, i.e. opposite to the direction of view in FIG. 19, FIG. 21 shows the outer link in FIG. 20 seen in perspective, but from the opposite side, FIG. 22 shows in perspective a second embodiment of a large outer link, FIG. 23 shows the same outer link as in FIGS. 20–21, but additionally with a steel item for moulding, FIG. 24 shows the link in FIG. 23, but seen from the opposite side, FIG. 25 shows in perspective a steel strap-plate for possible assembly in conveyor belts according to the invention, FIG. 26 shows how the steel strap-plates in FIG. 25 are to be assembled in pairs and mounted in a conveyor belt according to the invention, and FIG. 27 shows on a smaller scale an example of the use of an endless conveyor belt according to the invention in a so-called helical system.

DESCRIPTION OF THE SHOWN EMBODIMENTS

FIGS. 1–5 of the drawing show a basic embodiment in which small outer links (4) are used, and FIGS. 18–27 of the drawing show an embodiment of the conveyor belt according to the invention in which large outer links are used, the latter in several variations.

The embodiment in FIGS. 1–5 is mainly for ordinary belt conveyors, and the embodiment in FIGS. 18–27 is especially for operation in helical systems, e.g. as shown in FIG. 27.

The grid element shown in FIGS. 6–17 can be used as required both in connection with conveyor belts with small outer links and with large outer links, c.f. the following explanation.

First, the conveyor belt shown in FIGS. 1–5 is explained.

The belt is built up and held together by means of axles 3, i.e. solid plastic or steel axles, which are secured at each end to an outer link 4 which is injection moulded in plastic as a one-piece unit and has a configuration as shown in FIGS. 3 and 4. In each outer link there are two through-going holes 5 and 6. The elongated hole 6 is for the axle in the adjacent link, see FIGS. 1 and 2, so that the belt can run in a curve and still remain flat, in that the axle 3 can slide in the elongated hole 6, which is thus slightly larger than the axle diameter, so that the axle can move freely in the hole 6. The hole 5 is also elongated, but as will be seen in FIG. 3 it is usually shorter than twice the diameter of the axle. The elongated hole 5 comprises a snap-lock for the securing of an axle end. The elongated hole 5 has a circular part 9 for the introduction of an axle end, and in the centre of the hole there is seen a collar 7 which is partly annular in that end which is opposite the circular part 9. In both ends of the axle 3 there is an annular recess 11 of the same magnitude as the cross-sectional profile of the collar 7.

The axle is inserted into the area 9 until the annular recess 11 is opposite the collar 7, after which the axle can be snapped into the collar in the direction shown by the arrow 10. The outer link 4 has a greater material thickness in the area 12, i.e. where the axle is secured, and thus the locking together can be effected in such a manner that the end of the axle does not extend completely out through the outer link on the outer side. The assembly and disassembly of axles 3 and outer links 4 can be effected without the use of tools.

In FIG. 2A is seen the same conveyor belt as in FIGS. 1 and 2, but where on each axle 3 there is mounted a tube piece 13 and an annular spacer 14 at each side. This means that the end of each outer link 4 where the elongated hole 6 is disposed cannot be pressed inwards towards the centre of the belt, but is held out in place by the spacers 14. The tube piece 13 and the spacers 14 are preferably made of the same material as the axles, i.e. steel or plastic. The tube piece 13 can have an internal clearance which is slightly larger than the diameter of the axle 3, and thus the tube piece can function as a roller if necessary. The spacers 14 are configured in such a way that they can be displaced on the axle 3, but cannot move in over the tube pieces 13.

Additionally, the function of the spacers 14 is to protect the outer links 4 against the tube pieces 13. Other means can also be used to ensure that the ends of the outer links 4 cannot be pressed inwards, e.g. specially configured tracks or rails for the support of the conveyor belt.

The arrow 2 in FIGS. 1 and 2 indicates the direction of travel for the conveyor belt according to the invention, but the belt may well be drawn in the opposite direction. Regardless of the direction in which the conveyor belt 1 is drawn, the traction in the belt will ensure that the axle 3 cannot be pressed out of the collar 7.

The conveyor belt of the type shown in FIG. 1 can be used for the transport of larger objects which cannot fall down between the axles, e.g. whole loaves of bread and other larger objects.

If a conveyor belt as shown in FIGS. 1 and 2 is to be used for the transport of smaller objects, e.g. small foodstuff items, it can be mounted with chain links such as the grid elements 20 as shown in FIGS. 15 and 16. For the sake of clarity, in FIGS. 15 and 16 the outer links have been omitted, and only two grid elements 20 are shown in engagement with an axle 3, and it will be seen how the grid element is in engagement with and surrounds the axle 3. When the axles 3 are mounted with grid elements 20, the belt can be driven by a chain wheel which engages with the grid element at the places indicated by the arrows 32, so that the tractive force is transferred to the axles.

Each of the grid elements is injection moulded as a one-piece plastic component, and their shape and construction is shown in detail in FIGS. 6–17. In FIG. 16 is shown how the grid elements 20 can slide within one another when running in curves, e.g. in a helical system.

In FIGS. 6–14 it is seen that each grid element is made up of ribs, the top side 21 of which constitutes a supporting surface for the items which are to be transported, and the opposite side of which 29 constitutes an underside. The ribs in the grid element 20 are configured as trapezoidal parts 22, 23 on each side of transverse bridge parts 24. In the trapezoid parts there are elongated holes 25 for an axle 3 from an adjacent link and shorter elongated holes 26 for the link's own axle. Outermost in each side, the grid elements terminate with a rounded, raised portion 27, which ensures that the elements maintain distance from the outer link. 28 indicates the areas where there are holes directly through the element.

In FIGS. 6–12 it can be seen that the portion 30, which comprises the under part of both of the holes 25 and 26, is completely offset from that portion 31 which comprises the upper part of the holes 25 and 26, see especially FIG. 7. The grid part 7 can thus be injection moulded in an ordinary mould without the use of movable gates for the formation of the holes.

In FIGS. 15 and 16, with associated section sketch in FIG. 17, it is seen how flanges or projections 39, 40 on the end part 38 of one of the trapezoidal parts can enter into engagement with ribs 36, 37 on the adjacent link, said ribs 36, 37 being disposed in the space between two trapezoidal parts when the links 20 move towards each other which, for example, occurs on the inside of a curve when the belt is running in a curve as shown in FIG. 16. In the opposite side of the grid element are shown corresponding but laterally-reversed flanges or projections and ribs, see FIGS. 10 and 11, which show sections in the drawing's FIG. 6. The result of this configuration is that adjacent links are locked in relation to one another when running along a curved path, so that they cannot bend around the axles, which is a great advantage in helical systems and similar plants, in that the belt will remain flat during its upwards movement in the helix and not, as is the case with many of the known conveyor belts, have a tendency to rise up along the outer edge. When the belt is running along a straight path as shown in FIG. 15, there is no engagement between flanges and ribs, and the belt can bend in the normal manner, e.g. around a chain wheel.

When a conveyor belt according to the invention is running in a so-called helical system as shown in more detail in FIG. 27, use is preferably made of large outer links 71, which outer links are shown in different variations in FIGS. 18–24.

A helical system 75 with a self-stacking conveyor belt 79 is shown in FIG. 27, and comprises an endless conveyor belt which enters the helix at the bottom and is led out at the top in such a manner that the stack is slowly displaced vertically upwards as shown by the arrow 80. The area 76 is a loading area, and the area 77 is an unloading area for treated goods. Such systems are commonly known, e.g for the freezing-down or heating of food products, in that the helical part 75 itself is placed in a housing having the means necessary for cooling or heating. The conveyor belt according to the invention is particularly suitable for operation in such helical systems, mainly for the storage of many items, e.g. foodstuff items which require to be frozen or heated, but can also be used for the accumulation of items between machines in a production line.

FIG. 18 shows two parts of a conveyor belt 50 according to the invention and with large outer links 51, i.e. where one part of the belt is disposed over and resting on the underlying part, in that the outer links 51 are configured and arranged to support and guide each other, c.f. the following explanation. In order to give the conveyor chain more strength and stability, in the example shown the two outer links 51 lying laterally-reversed opposite each other are coupled together by means of two axles per outer link pair. The axles 3 are secured in holes 55 in the large outer links in quite the same way as explained in connection with FIGS. 3–5, so that assembly and disassembly takes place in a corresponding manner. Moreover, use is shown of the same type of grid element 20 as explained earlier in connection with FIGS. 6–17. In each side there is also shown use of steel strap-plates 52 configured as shown in more detail in FIGS. 25 and 26. Such steel strap-plates can also be inserted in the conveyor belt shown in FIGS. 1–2, but they are only necessary for belts with high loads. With the loads which normally arise, the outer links are strong enough to transfer the necessary tractive force. The strap-plates 52, which are normally disposed in pairs as shown in FIG. 26, have holes 65 for engagement with the chain link's axles 3, and an elongated hole 66 for engagement with the axle from the adjacent link, so it is possible for the belt to travel along a curved path.

In FIGS. 19–21 is shown a first embodiment of a large outer link 71 moulded in plastic or steel as a one-piece unit. The selection of construction material will depend on the degree of strength it is desired to achieve. The underside has a track 58, the breadth of which corresponds to the total breadth of the top edge 57, in that the link comprises two offset but integrally-formed, vertically-extending areas or wall parts 54, and inclined reinforcement areas 62 integral herewith and down to a part 69 in which the holes 55 are provided for the fastening of the axles 3. The track 58 arises between downwardly-extending parts 59 and 60 in such a manner that the conveyor belt cannot only rest on top of corresponding outer links, but also so that these are guided in the lateral direction. As shown in FIGS. 19–21, the outer link 71 can also comprise a central and horizontally-extending centre rib 53 for engagement with a corresponding recess 63 in an adjacent link. There is hereby formed a railing which faces inwards towards the product-bearing area, which is advantageous e.g. in the transport of round objects such as cans. The edge 70, opposite that edge where the centre rib 53 is disposed, can be cut away at an angle 61 so that the conveyor belt can run in a curve with rearwards bending if necessary.

FIG. 22 shows a second embodiment of a large outer link, i.e. where the walls 54 are configured with large openings 64 for the introduction of air or other gases, e.g. for cooling or heating of items on the conveyor belt.

Finally, in FIGS. 23–24 is seen an embodiment where the downwardly-extending part 69, the underside of which is arranged e.g. to rest against a helical stack's support, has a moulded-in steel item 67, e.g. of stainless steel. The steel item 67, e.g. having a shape as shown in the drawing before being moulded-in, can be moulded-in at the same time that the link 71 itself is moulded. It is hereby achieved that the outer links 71 do not get into direct contact with possible supporting elements, which are usually of stainless steel. The contact between the lowermost tier in a helical stack and its support thus takes place solely via the downwardly-facing surfaces 68, so that the plastic links 71 do not make contact with the helical stack's support, which often comprises an endless conveyor chain of stainless steel or the like.

What is claimed is:

1. A conveyor belt comprising a plurality of identical linkages in the formation of an endless belt, wherein each linkage of said plurality of linkages comprises:
   at least one axle arranged transversely in relation to a direction of travel of the belt; and
   at least one outer link at each end of and in firm engagement with said axle, said outer link comprising at least one elongated hole for receiving an axle of an adjacent link and arranged in such a manner that the belt can travel in a curve in a plane of the belt, a radius of which is dependent on the size of the elongated hole, and at least one securing hole for receiving said axle, said securing hole comprising a snap-lock for providing a separable coupling together with the end of said axle which includes a coupling portion engagable with a corresponding portion of said snap-lock, wherein said outer link is a moulded one-piece unit of a suitable plastic material and said snap-lock includes a partial annular collar.

2. The conveyor belt according to claim 1, wherein said securing hole is a through-going hole with an elongated length which is less than twice a diameter of said axle, and includes a partial annular collar, and wherein said coupling portion of said axle includes a recess positioned a distance from said end of said axle with a cross-sectional profile which corresponds to a cross-sectional profile of said annular collar.

3. The conveyor belt according to claim 2, wherein said axle further comprises a positioning element for engaging said elongated hole, said positioning element comprising a tube piece which surrounds an inner portion of said axle, and an annular spacer positioned on said axle at each end of said tube piece between the end of said tube piece and said outer link.

4. The conveyor belt according to claim 1, wherein said axle further comprises a positioning element for engaging said elongated hole, said positioning element comprising a tube piece which surrounds an inner portion of said axle, and an annular spacer positioned on said axle at each end of said tube piece between the end of said tube piece and said outer link.

5. A conveyor belt comprising a plurality of identical linkages in the formation of an endless belt, wherein each linkage of said plurality of linkages comprises:
   at least one axle arranged transversely in relation to a direction of travel of the belt; and
   at least one outer link at each end of and in firm engagement with said axle, said outer link comprising at least one elongated hole for receiving an axle of an adjacent link and arranged in such a manner that the belt can travel in a curve in a plane of the belt, a radius of which is dependent on the size of the elongated hole, and at least one securing hole for receiving said axle, said securing hole comprising a snap-lock for providing a separable coupling together with the end of said axle which includes a coupling portion engagable with a corresponding portion of said snap-lock, wherein said outer link is a moulded one-piece unit of a suitable plastic material;
   wherein said securing hole is a through-going hole with an elongated length which is less than twice a diameter of said axle, and includes a partial annular collar, and wherein said coupling portion of said axle includes a recess positioned a distance from said end of said axle with a cross-sectional profile which corresponds to a cross-sectional profile of said annular collar.

6. A conveyor belt comprising a plurality of identical linkages in the formation of an endless belt, wherein each linkage of said plurality of linkages comprises:

at least one axle arranged transversely in relation to a direction of travel of the belt; and at least one outer link at each end of and in firm engagement with said axle, said outer link comprising at least one elongated hole for receiving an axle of an adjacent link and arranged in such a manner that the belt can travel in a curve in a plane of the belt, a radius of which is dependent on the size of the elongated hole, and at least one securing hole for receiving said axle, said securing hole comprising a snap-lock for providing a separable coupling together with the end of said axle which includes a coupling portion engagable with a corresponding portion of said snap-lock, wherein said outer link is a moulded one-piece unit of a suitable plastic material;

wherein said axle further comprises a positioning element for engaging said elongated hole, said positioning element comprising a tube piece which surrounds an inner portion of said axle, and an annular spacer positioned on said axle at each end of said tube piece between the end of said tube piece and said outer link.

7. A conveyor belt comprising a plurality of identical linkages to form an endless belt, wherein each linkage of said plurality of linkages comprises:

at least one axle arranged transversely in relation to a direction of travel of the belt;

at least one outer link at each end of and in firm engagement with said axle, said outer link comprising at least one elongated hole for receiving an axle of an adjacent linkage and placed in such a manner that the belt can travel in a curve in a plane of the belt, a radius of which is dependent on the size of the elongated hole; and a plurality of supporting elements for supporting items which are to be transported on the belt, said plurality of support elements comprising grid elements, each of said grid elements being moulded together as a one-piece unit of plastic, and each comprising first and second trapezoidal members and first and second transverse bridge portions extending along a base of said first and second trapezoidal members, respectively, wherein said first trapezoidal members includes a first transverse hole for receiving said axle of said linkage and said second trapezoidal member includes a second transverse hole for receiving an adjacent axle of an adjacent linkage, wherein said first and second trapezoidal members are offset from each other, so that at least one second trapezoidal member of said second trapezoidal members is positionable within a space defined between a pair of adjacent first trapezoidal members of an adjacent linkage, wherein at least outermost second trapezoidal members at each end of an adjacent axle comprise first and second projections at a front edge and a rear edge thereof, said first and second projections being engageable with a pair of ribs located within said space defined by said pair of first trapezoidal members of said adjacent linkage wherein a first rib of said pair of ribs is located on one of said pair of first trapezoidal members and a second rib of said pair of ribs is located on the other of said pair of first trapezoidal members.

8. A conveyor belt comprising a plurality of identical linkages in the formation of an endless belt, wherein each linkage comprises:

at least one axle arranged transversely in relation to a direction of travel of the belt;

at least one outer link at each end of and in firm engagement with said axle(s), said outer link comprising at least one elongated hole for receiving an axle of an adjacent linkage and placed in such a manner that the belt can be driven in a curve in a plane of the belt, a radius of which is dependent on the size of the elongated hole; and a plurality of support elements for supporting items which are to be transported on the belt, said plurality of support elements comprising grid elements, each of said grid elements being moulded together as a one-piece unit of plastic and each comprising first and second trapezoidal members and first and second transverse bridge portions extending along a base of said first and second trapezoidal members, respectively, wherein said first trapezoidal member includes a first transverse hole for receiving said axle of said linkage and said second trapezoidal member includes a second transverse hole for receiving an adjacent axle of an adjacent linkage, wherein said first and second trapezoidal members are offset from each other so that at least one second trapezoidal member of said second trapezoidal members is positionable withing a space defined between a pair of adjacent first trapezoidal members of an adjacent linkage, and wherein said space defined by a pair of adjacent first trapezoidal members includes rib-like portions and an uppermost portion of said first transverse hole is offset from a lowermost portion of said first transverse hole to form a trapezoidal hole and an uppermost portion of said second transverse hole is offset from a lowermost portion of said second transverse hole to form a trapezoidal hole, wherein said lowermost portion of said first transverse hole is adjacent said lowermost portion of said second transverse hole.

9. A conveyor belt comprising a plurality of identical linkages in the formation of an endless belt, wherein each linkage of said plurality of linkages comprises:

at least one axle arranged transversely in relation to a direction of travel of the belt; and at least one outer link at each end of and in firm engagement with said axle, said outer link comprising at least one elongated hole for receiving an axle of an adjacent linkage and placed so that the belt can be driven in a curve in a plane of the belt, a radius of which is dependent on the size of the elongated hole wherein each outer link comprises an upwardly-facing side plate moulded in one piece with the link, said side plate having two areas which are offset from each other in the vertical plane, so that adjacent side plates of adjacent linkages can slide in over each other, and wherein an underside of said outer link opposite said upwardly-facing side plate comprises a track arranged so that the linkage can rest on an upper edge of a upwardly-facing side plate of an underlying conveyor belt, said track being formed by a first downwardly-extending part, a second downwardly-extending part offset from said first downwardly-extending part, and a substantially lateral track surface thereinbetween so that said upper edge of a upwardly-facing side plate of said underlying conveyor belt contacts said substantially lateral track surface, and is received between said first downwardly-extending part and said second downwardly-extending part.

10. The conveyor belt according to claim 9, wherein said outer link includes at least two securing holes, each for receiving said axle, said securing holes comprising a snap-lock for providing a separable coupling together with an end of said axle which includes a coupling portion engagable with a corresponding portion of said snap-lock, wherein the outer link is moulded as a one-piece unit.

11. A conveyor belt comprising a plurality of identical linkages in the formation of an endless belt, wherein each linkage of said plurality of linkages comprises:

at least one axle arranged transversely in relation to a direction of travel of the belt; and at least one outer link at each end of and in firm engagement with said axle, said outer link comprising at least one elongated hole for receiving an axle of an adjacent linkage and placed so that the belt can be driven in a curve in a plane of the belt, a radius of which is dependent on the size of the elongated hole wherein each outer link comprises an upwardly-facing side plate moulded in one piece with the link, said side plate having two areas which are offset from each other in the vertical plane, so that adjacent side plates of adjacent linkages can slide in over each other, and wherein an underside of said outer link opposite said upwardly-facing side plate comprises a track arranged so that the linkage can rest on an upper edge of a upwardly-facing side plate of an underlying conveyor belt;

wherein a rearwardly-facing edge of each side plate is cut off at an angle at the uppermost part of the edge.

12. The conveyor belt according to claim 9 or 11, wherein the side plate includes at least one through-going opening.

13. A conveyor belt comprising a plurality of identical linkages in the formation of an endless belt, wherein each linkage of said plurality of linkages comprises:

at least one axle arranged transversely in relation to a direction of travel of the belt; and at least one outer link at each end of and in firm engagement with said axle, said outer link comprising at least one elongated hole for receiving an axle of an adjacent linkage and placed so that the belt can be driven in a curve in a plane of the belt, a radius of which is dependent on the size of the elongated hole wherein each outer link comprises an upwardly-facing side plate moulded in one piece with the link, said side plate having two areas which are offset from each other in the vertical plane, so that adjacent side plates of adjacent linkages can slide in over each other, and wherein an underside of said outer link opposite said upwardly-facing side plate comprises a track arranged so that the linkage can rest on an upper edge of a upwardly-facing side plate of an underlying conveyor belt;

wherein said outer link includes at least two securing holes, each for receiving said axle, said securing holes comprising a snap-lock for providing a separable coupling together with an end of said axle which includes a coupling portion engagable with a corresponding portion of said snap-lock, wherein the outer link is moulded as a one-piece unit;

wherein the securing holes are through-going, elongated holes with a length which is less than twice the diameter of the axle, and wherein an inside of each securing hole includes a partial annular collar, and wherein said axle includes a recess positioned a distance from said end of said axle with a cross-sectional profile which corresponds to a cross-sectional profile of said annular collar.

14. The conveyor belt according to claim 10 or 13, wherein the outer link is configured as a one-piece unit of plastic or metal.

15. A conveyor belt comprising a plurality of identical linkages in the formation of an endless belt, wherein each linkage of said plurality of linkages comprises:

at least one axle arranged transversely in relation to a direction of travel of the belt; and at least one outer link at each end of and in firm engagement with said axle, said outer link comprising at least one elongated hole for receiving an axle of an adjacent linkage and placed so that the belt can be driven in a curve in a plane of the belt, a radius of which is dependent on the size of the elongated hole wherein each outer link comprises an upwardly-facing side plate moulded in one piece with the link, said side plate having two areas which are offset from each other in the vertical plane, so that adjacent side plates of adjacent linkages can slide in over each other, and wherein an underside of said outer link opposite said upwardly-facing side plate comprises a track arranged so that the linkage can rest on an upper edge of a upwardly-facing side plate of an underlying conveyor belt;

wherein each outer link further comprises at least one reinforcement rib which supports the side plate.

16. A conveyor belt comprising a plurality of identical linkages in the formation of an endless belt, wherein each linkage of said plurality of linkages comprises:

at least one axle arranged transversely in relation to a direction of travel of the belt; and at least one outer link at each end of and in firm engagement with said axle, said outer link comprising at least one elongated hole for receiving an axle of an adjacent linkage and placed so that the belt can be driven in a curve in a plane of the belt, a radius of which is dependent on the size of the elongated hole wherein each outer link comprises an upwardly-facing side plate moulded in one piece with the link, said side plate having two areas which are offset from each other in the vertical plane, so that adjacent side plates of adjacent linkages can slide in over each other, and wherein an underside of said outer link opposite said upwardly-facing side plate comprises a track arranged so that the linkage can rest on an upper edge of a upwardly-facing side plate of an underlying conveyor belt;

wherein each outer link comprises a central rib for engagement with a corresponding groove in an adjacent linkage, and lying on a side of the outer link which is arranged to face inwards towards goods to be transported by the belt.

17. A conveyor belt comprising a plurality of identical linkages in the formation of an endless belt, wherein each linkage of said plurality of linkages comprises:

at least one axle arranged transversely in relation to a direction of travel of the belt; and at least one outer link at each end of and in firm engagement with said axle, said outer link comprising at least one elongated hole for receiving an axle of an adjacent linkage and placed so that the belt can be driven in a curve in a plane of the belt, a radius of which is dependent on the size of the elongated hole wherein each outer link comprises an upwardly-facing side plate moulded in one piece with the link, said side plate having two areas which are offset from each other in the vertical plane, so that adjacent side plates of adjacent linkages can slide in over each other, and wherein an underside of said outer link opposite said upwardly-facing side plate comprises a track arranged so that the linkage can rest on an upper edge of a upwardly-facing side plate of an underlying conveyor belt;

wherein said linkage includes an underside which comprises an area arranged to lie against a support, said area including a moulded-in wear-plate lying substantially horizontal with said linkage.

18. The conveyor belt according to claim 17, wherein said wear-plate is stainless steel.

* * * * *